United States Patent [19]

Miller

[11] Patent Number: 4,504,168

[45] Date of Patent: Mar. 12, 1985

[54] CONNECTING STRUCTURE

[76] Inventor: Michael C. Miller, 916 S. Balentine, Bloomington, Ind. 47401

[21] Appl. No.: 248,645

[22] Filed: Mar. 27, 1981

[51] Int. Cl.³ .............................................. F16B 5/07
[52] U.S. Cl. .................................... 403/353; 403/331;
403/381; 403/339; 403/340; 52/312; 24/700;
24/453; 24/704; 24/625; 24/618; 24/662
[58] Field of Search ............... 403/339, 381, 331, 353,
403/382, 354, 361, 340, 25; 24/201 C, 216, 213
B, 292, 297; 150/3; 52/312, 73, 811, 591, 594;
108/901, 159

[56] References Cited

U.S. PATENT DOCUMENTS 2,678,476  3/1954  Carter .................................... 52/312
3,731,445  5/1973  Hoffmann et al. ............... 52/582 X

FOREIGN PATENT DOCUMENTS 2905228  8/1979  Netherlands ......................... 52/594

Primary Examiner—Cornelius J. Husar
Assistant Examiner—Joseph A. Fischetti
Attorney, Agent, or Firm—Barnes, Kisselle, Raisch, Choate, Whittemore & Hulbert

[57] ABSTRACT

Structure for connecting two members together, each including parallel, spaced apart, oppositely disposed, opposed surfaces having a cross section including a short straight portion adjacent one edge thereof, a longer obliquely extending portion extending from the other edge thereof and merging with an arcuate connecting portion which intersects the shorter straight portion, which surfaces are complementary and arranged to be in engagement with the members assembled. In one modification of the invention, the oblique portion of the surface cross section starts prior to the plane of the short straight line portion of the cross section and crosses it prior to merging with the connecting portion of the cross section. In another modification, the cross section of the surfaces of one member is formed with short straight portions at both edges of the surfaces with obliquely extending portions extending both ways from the center of the surface terminating in separate arcuate portions intersecting the short straight portions of the cross section. The connecting structure may be utilized to implement fasteners similar to nuts and bolts, may be utilized to secure a plurality of annular or polygonal members in a single plane, and to connect a plurality of separate members serially. Further, the connecting structure of the invention has particular application in a variety of boxes, hangers, connectors and fasteners.

13 Claims, 32 Drawing Figures

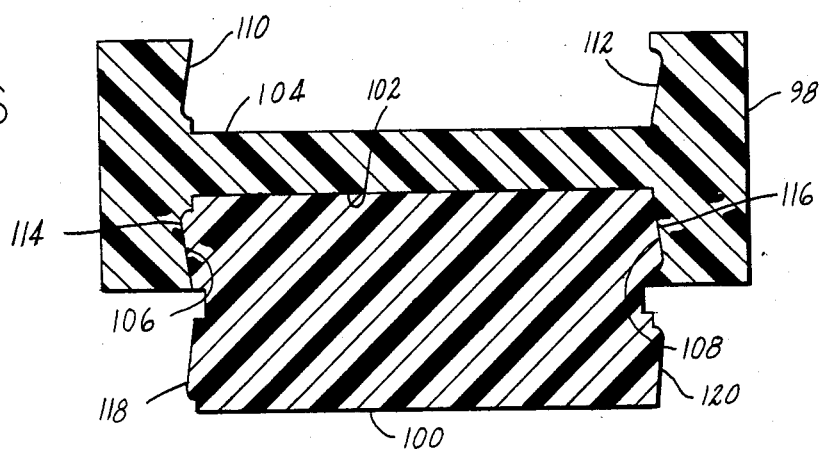
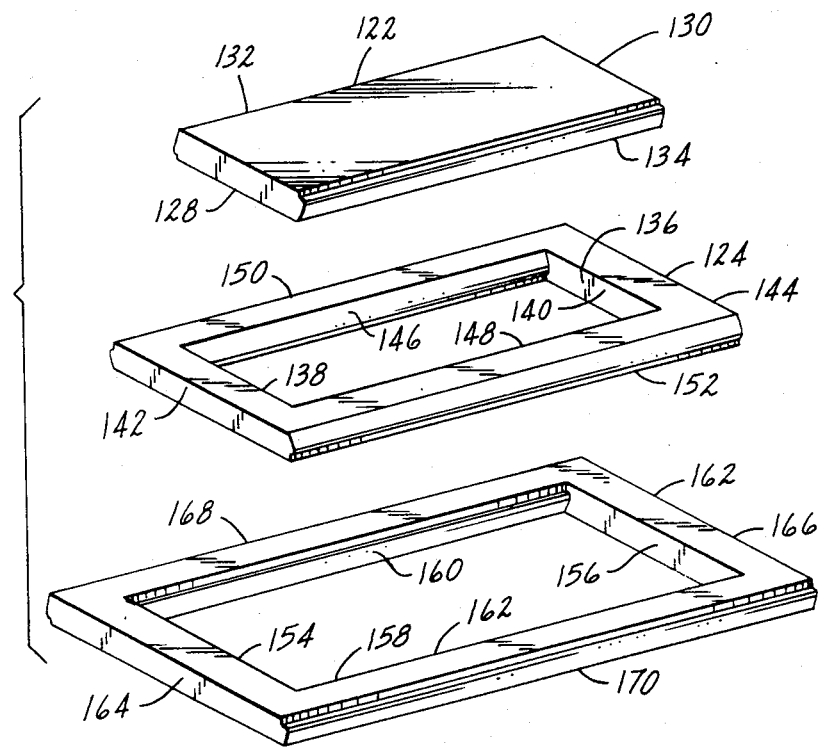
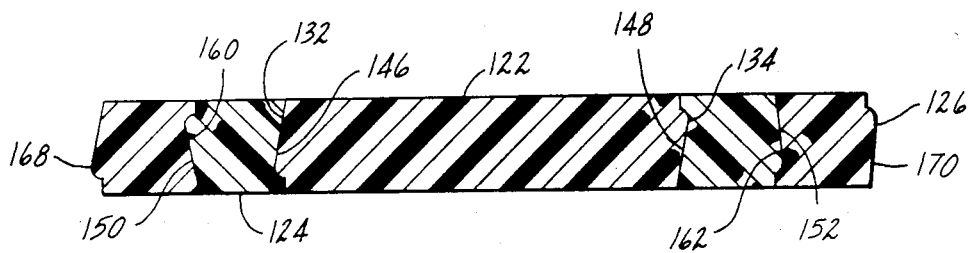

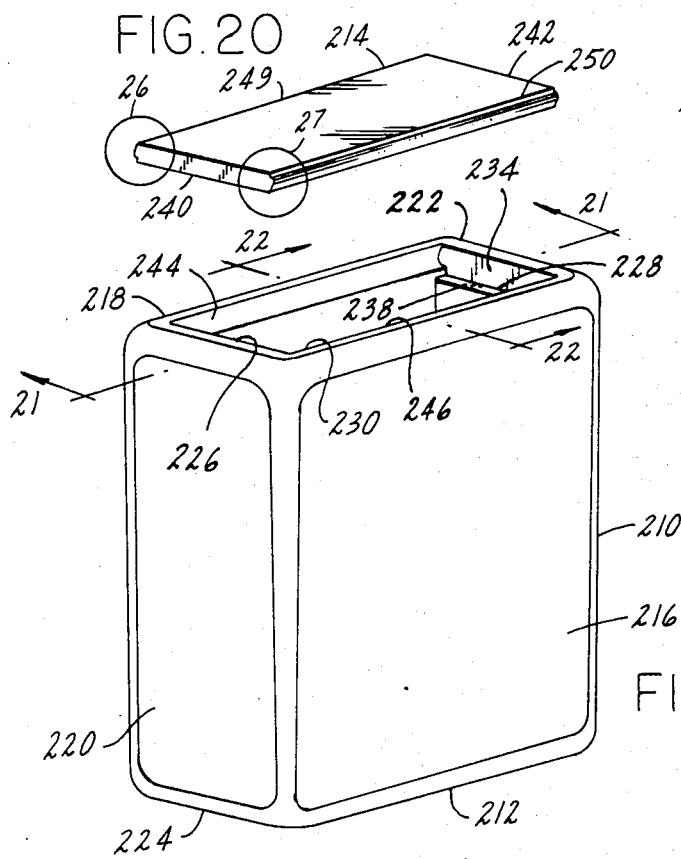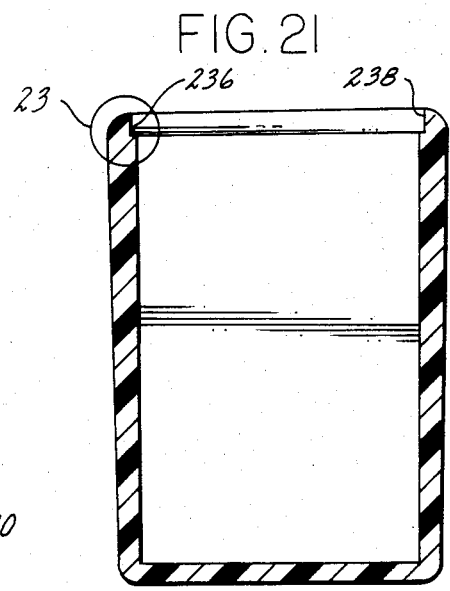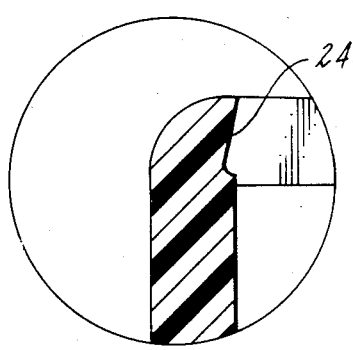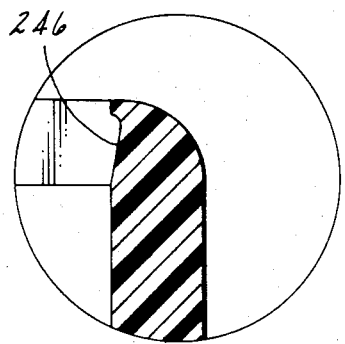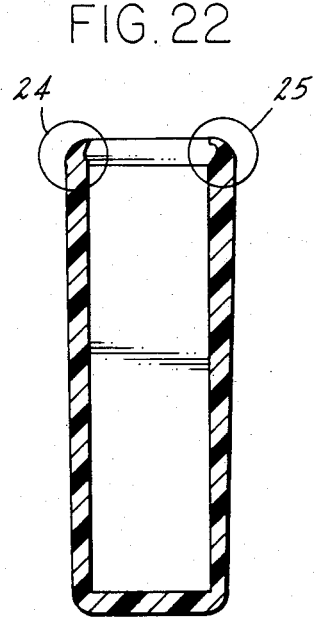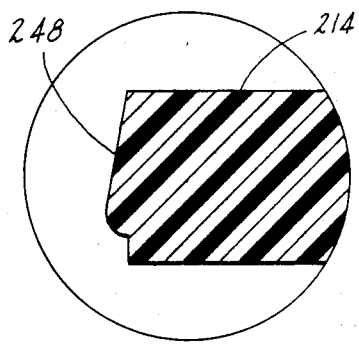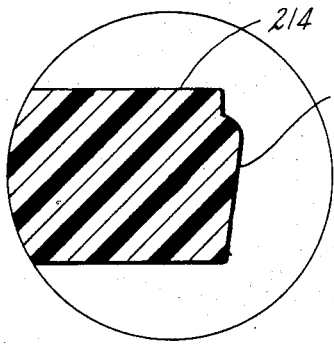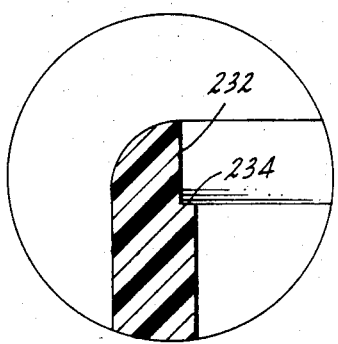

CONNECTING STRUCTURE

BACKGROUND OF THE INVENTION

1. Field of the Invention

The invention relates to connecting structures and refers more specifically to structure for releasably or permanently connecting two members together due to the configuration of certain portions thereof without additional structure.

2. Description of the Prior Art

In the past, connecting structures have taken the form of screw threads, clamping or snap-in members, and the like.

Clamping or snap-in members have a particular advantage in rapid assembly and disassembly. However, in the past, such members have often been deficient in that they have been either difficult to assemble or have been too loose when assembled, or have required extreme resilience which could not be obtained with many otherwise desirable materials. Further, re-use of many previous clamping or snap-in devices has been impossible. That is, once assembled, they are destroyed by disassembly so that they are incapable of being re-used.

Further, prior connecting structures have generally not been sufficiently versatile to permit the use of the same structure for permanent connections and releasable connections and to permit substantially the same structure to be used over a wide variety of material having different resiliency and in a wide variety of applications.

SUMMARY OF THE INVENTION

In accordance with the invention, basic connecting structure has been provided for connecting two members together. In accordance with the invention, the members have opposed parallel surfaces which have oppositely directed cross sections, each including a short portion adjacent one edge thereof, a diagonal portion extending from the other edge thereof terminating in a connecting portion which in turn intersects the short portion. The surfaces on the two members are complementary and are spaced apart and arranged so that the surfaces on the two members are engaged on placing the members in the position it is desired to have them in when they are connected.

In accordance with the invention, the cross section of the engaging surfaces on the two members may be either oppositely directed or directed in the same direction. The diagonally extending portion of the surface cross sections may start in the plane of the short portion of the surface cross section or may start so as to be required to cross the plane of the short portion of the cross section prior to merging with the connecting portion of the cross section so as to permit use of less resilient material, and the cross section of the parallel surfaces of one of the members may be a composite of the cross section of the same surfaces positioned in opposite directions so as to prevent assembly of the other member therewith in the wrong direction.

Further, in accordance with the invention, the connecting structure may be utilized to connect members serially, that is, linearly or in the same plane. In addition, the connecting structure may be used in conjunction with a plurality of different boxes to secure tops thereto and with devices such as towel and paper racks, furniture and elongated fasteners, etc. Accordingly, it is not intended that the utilization of the connecting structure of the invention be limited by the specific utilization thereof disclosed herein.

BRIEF DESCRIPTION OF THE DRAWINGS

FIG. 16 is a section view illustrating the use of the connecting structure of the invention as shown in FIG. 7 in serially connecting members together.

FIG. 17 illustrates the use of the connecting structure of the invention as shown in FIGS. 5 and 6 utilized in connecting a plurality of members together in the same plane.

FIG. 18 is a section view of the members of FIG. 17 connected together in the same plane by the connecting structure of the invention.

FIG. 19 is a perspective view of a novelty box constructed to permit securing a top thereto by the connecting structure of the invention.

FIG. 20 is a perspective view of the top of the novelty box illustrated in FIG. 19.

FIG. 21 is a section view of the novelty box illustrated in FIG. 19 taken substantially on the line 21—21 in FIG. 19.

FIG. 22 is a section view of the novelty box illustrated in FIG. 19 taken substantially on the line 22—22 in FIG. 19.

FIG. 23 is an enlarged partial section view of the novelty box illustrated in FIG. 19 taken in the circle 23 in FIG. 21.

FIG. 24 is an enlarged partial section view of the novelty box illustrated in FIG. 19 taken in the circle in FIG. 22.

FIG. 25 is an enlarged partial section view of the novelty box illustrated in FIG. 19 taken in the circle 25 in FIG. 22.

FIG. 26 is an enlarged partial section view of the top of the novelty box illustrated in FIG. 20 taken in the circle 26 in FIG. 20.

FIG. 27 is an enlarged partial section view of the top of the novelty box illustrated in FIG. 20 taken in the circle 27 in FIG. 20.

DESCRIPTION OF THE PREFERRED EMBODIMENT

Figure 10:
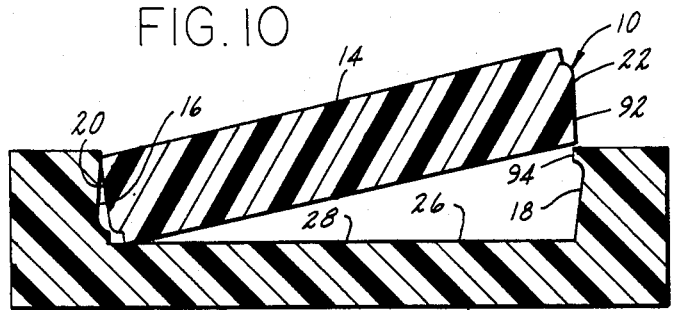
FIG. 10 is a section view illustrating two members in the process of being connected together by the connecting structure of the invention including surfaces as shown in FIG. 1.

As shown specifically in FIG. 10, the connecting structure 10 of the invention is utilized on a pair of members 12 and 14, each having a pair of opposed parallel surfaces such as surfaces 16 and 18 of member 12 and surfaces 20 and 22 of member 14, inversely oriented on the same member and are complementary wherein the surfaces of the separate members engage each other to hold the members 12 and 14 in assembly.

The surfaces 16, 18, 20 and 22 have a particular configuration, which configuration is particularly oriented on the members as shown in FIG. 10. The particular configuration of the surface 18 is shown in section in FIG. 1.

Figure 1:
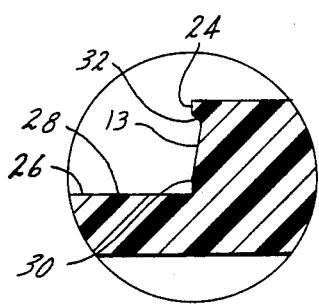
FIG. 1 is a partial section view of a member having a surface thereon including the configuration of the connecting structure of the invention.

As shown in FIG. 1, the section of surface 18 includes a relatively short straight portion 24 extending substantially perpendicularly to the bottom 26 of the recess 28. Surface 18 further includes a longer, substantially straight section portion 30 starting from the general plane of the straight portion 24 on the edge of surface 18 opposite the short portion 24 and extending obliquely thereto at an angle of approximately 10°. Further, the surface 18, as shown, merges gradually with the arcuate connecting portion 32 of the section of surface 18, which connecting portion then terminates at the shorter portion 24 of the section of surface 18 and at the point of termination is substantially perpendicular to the short portion 24.

While the surface 18 of the connecting structure 10 is preferably as shown in FIG. 1, it will be understood that the surface may be modified in accordance with the invention within the scope of the invention. Thus, for example, the arcuate portion 32 of the cross section of surface 18 may be replaced by a second short linear portion substantially defined by the cord of the arcuate portion 32 to connect the lower terminal end of the short portion 24 and the upper terminal end of the oblique portion 30. Further, surface portion 24 need not be straight or perpendicular to the bottom 26 of recess 28.

Figure 12:
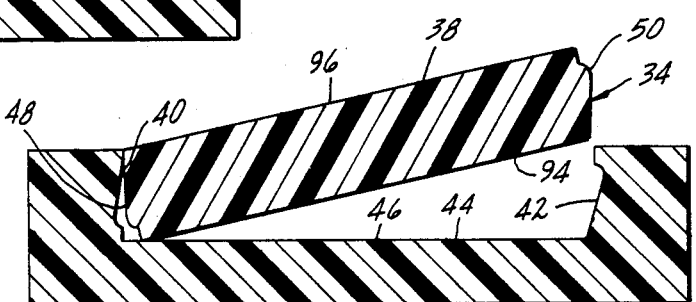
FIG. 12 is a section view illustrating two members in the process of being connected together by the connecting structure of the invention including surfaces as shown in FIG. 2.

The basic connecting structure 10 may also be modified to provide connecting structure 34, as particularly shown in FIG. 12. The connecting structure 34 again is utilized to connect the members 36 and 38 and includes the parallel spaced apart surfaces 40 and 42 on the sides of recess 44 in the member 36 having the bottom 46 and sides 48 and 50 on the member 38.

Figure 2:
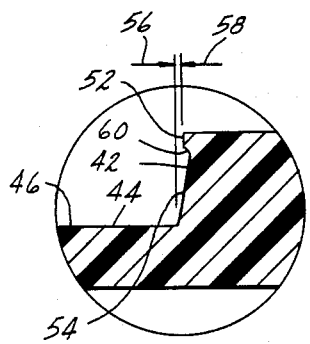
FIG. 2 is a partial section view of a member similar to that of FIG. 1 showing a first modification of the configuration of the connecting structure surface of the invention.

More specifically, the surfaces 40, 42, 48 and 50 of the connecting structure 34 are as shown in section in FIG. 2. Thus, the surface 42 includes a short, substantially straight portion 52 extending substantially perpendicularly to the bottom 46 of the recess 44. The surface 42 also includes a longer, substantially straight portion 54 extending from the bottom 46 of the recess 44 obliquely to the plane of the surface portion 52, which obliquely extending surface starts at a point inwardly of the recess 44 with respect to surface portion 52, by an amount designated in FIG. 2 between the arrows 56 and 58, whereby the surface 54 must subsequently cross the plane of the shorter surface 52. The obliquely extending surface 54 then again terminates in an arcuate surface 60 which itself terminates at the intersection thereof with the shorter, straight surface 52 substantially perpendicular thereto.

Again, the surface 42 may be slightly modified within the scope of the invention to, for example, include an angularly extending surface in place of the arcuate connecting surface portion 60 which is essentially a cord of the surface 60. The surface 52 need not be straight and need not be exactly perpendicular to the bottom 46 of the recess 44 as shown but may extend obliquely thereto as, for example, at an angle substantially the same as the angle which the member 54 makes with the bottom of the recess 44.

Figure 14:
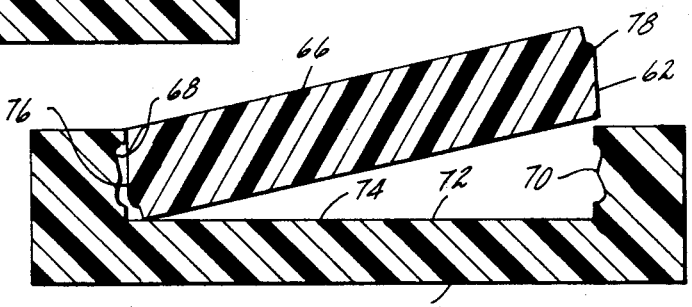
FIG. 14 is a section view illustrating two members in the process of being connected together by the connecting structure of the invention including surfaces as shown in FIG. 3.

In the further modified connecting structure 62 shown in FIG. 14, utilized to connect the members 64 and 66 together, the member 64 includes the surfaces 68 and 70 in the recess 72 having the bottom 74. Member 66 has the surfaces 76 and 78 thereon.

The surfaces 76 and 78 may be the same as the surfaces 20 and 22 or 48 and 50 as shown in FIGS. 1 and 2 and FIGS. 10 and 12.

Figure 3:
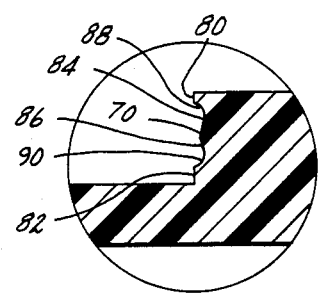
FIG. 3 is a partial section view of a member similar to that of FIG. 1, showing a second modification of the configuration of the connecting structure.

Surfaces 68 and 70 may be substantially the same. Surface 70 is shown in FIG. 3. Surface 70 includes the relatively short portions 80 and 82 at the opposite edges thereof and slightly longer, oblique portions 84 and 86 starting from substantially the plane of the surfaces 80 and 82 and extending outwardly of the recess 72 as shown into the member 64 at an angle of approximately 10° from the center of the depth of the recess. The surface portions 84 and 86 terminate in arcuate surface portions 88 and 90, which arcuate surface portions terminate at the short surface portions 80 and 82 substantially perpendicular thereto, as before.

The surface 70 is thus a composite of surfaces such as 18 or 42 in inverse positions with all the material of the member 64 deleted therefrom which would be deleted with surfaces 18 or 42 in both the position shown in FIG. 1 or 2 and in the inverse position.

Referring now to the particular connecting structure 10 illustrated in FIG. 10, it will be noted that the surfaces 18 and 20, while having the same configuration, are in inverse relation. That is to say, the surface 18 as shown in FIG. 10 has the short, straight portion at the top thereof and the obliquely extending portion at the bottom. The surface 16 has the short, straight portion at the bottom and the obliquely extending portion at the top thereof. The surfaces 20 and 22 are complementary to the respective surfaces 16 and 18. That is to say, their form is as shown in FIG. 10 and the surfaces match exactly the surfaces 16 and 18 with the member 14 completely positioned in the recess 26. Thus, the surfaces 20 and 22 are also in inverse relation with respect to each other and are parallel spaced apart surfaces as are the surfaces 18 and 20.

The connecting structure as shown in FIG. 10 is particularly adaptable for use with resilient or semi-resilient material such as thermoplastics and the like. Thus, the member 14 may be positioned in the recess 26 by slightly deforming the members 12 and 14 after the members have been positioned as shown in FIG. 10 to permit the corner of the member 14 to pass the projection formed by the surface 18 in the recess 26.

After assembly of the member 14 into recess 26 in the member 12, removal of the member 14 while possible is difficult. The connection between the members 12 and 14 is substantial. Also, it will be noted that the connection may be made without any tools. The members 12 and 14 can of course take any configuration outside of the recess 26 and outside the surfaces of the member 14 which fit into the recess 26. The particular configuration of the members 12 and 14 in FIG. 10 is only to show the connecting structure of the invention and not to show particular application thereof, which applications are considered herein subsequently.

Figure 11:
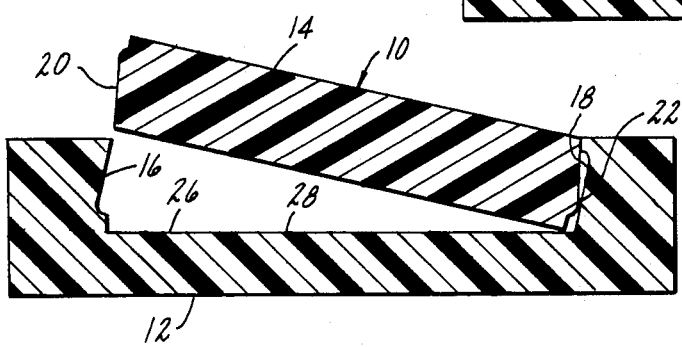
FIG. 11 is a section view illustrating the members as shown in FIG. 10 in the process of being connected together with the members reversed.

Should it be desired that the connection between the members 12 and 14 be even more permanent than that provided with the releasable structure 10 indicated in FIG. 10, the connection between the members 12 and 14 may be more permanent if the member 14 is turned side for side or top for bottom as shown in FIG. 11 and the member 14 again positioned in the recess 26. With the member 14 so positioned with the surface 22 for example as shown in FIG. 11 adjacent the surface 16 of the recess 26 and with the surface 20 adjacent the surface 18 in the recess 26, it is substantially impossible to separate the members 12 and 14.

The connecting structure 34 particularly illustrated in FIG. 12 differs from that illustrated in FIG. 10 in that the recess 44 is either slightly wider or the member 38 is slightly narrower. The difference in dimensions being substantially the dimension shown in FIG. 2 between the arrows 56 and 58. Thus, the connecting structure 34 of FIG. 12 is particularly useful with material having less resiliency such as wood, some metals, and some less resilient plastics.

Figure 13:
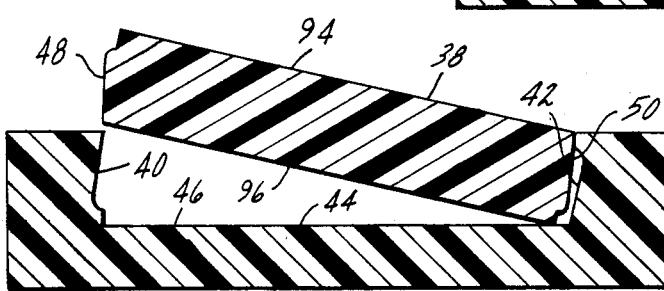
FIG. 13 is a section view illustrating the members as shown in FIG. 12 in the process of being connected together with the members reversed.

Again, a tighter connection can be made with the modified connecting structure 34 by inverting the member 38 as shown in FIG. 13 so that the bottom 96 becomes the top of the member 38 and the top 96 of the member 38 as shown in FIG. 12 becomes the bottom of the member 38 as shown in FIG. 13. Again, the connection between the members 38 and 36 is substantially permanent as shown in FIG. 13.

The particular connecting structure 62 of FIG. 14 including surfaces as particularly shown in FIG. 3 has been provided to make the member 66 universal; this is, the member 66 may be positioned in the recess 72 in the member 64 without regard to orientation of the member 66. That is, as to top, bottom, right or left side. Again, the surfaces 68 and 70 may be constructed in accordance with the difference in the surfaces shown in FIG. 1 or 2 depending upon the resiliency of the material of which the members 66 and 64 are constructed.

Obviously, the member 66 will, due to the peculiar structure of the surfaces 68 and 70, be universal with regard to orientation. That is, the connection between the members 64 and 66 will be substantially the same regardless of the top, bottom and side orientation of the member 66. The connection of the members 64 and 66 will thus be similar to one of the connections 10 and 12 in all orientations of the member 66.

The connecting structures of FIGS. 10–14 having surfaces as shown in FIGS. 1–3 may be utilized for example to connect various shaped members serially. Thus, particularly referring to FIG. 16, the members 98 and 100 are connected together with connecting structure 10, with the understanding that a second member such as member 98 may be connected to the member 100 shown in FIG. 16, while a second member such as the member 100 may be connected to the member 98 as shown in FIG. 16, and additional members such as members 98 and 100 may be connected in line or serially to the added members as long as a desired linear or serial connection is desired.

Figure 4:
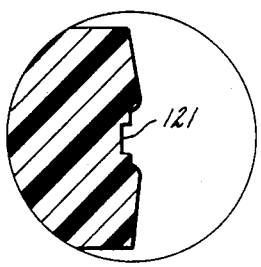
FIG. 4 is a partial section view of connecting structure constructed in accordance with the invention on one member for use in a particular application of the invention.

Again, the particular configuration of the members 98 as shown in FIG. 16 is not critical except in the area of the recesses 102 and 104. The opposite sides of the recesses, that is, the sides 106 and 108 of the recess 102 and the sides 110 and 112 of the recess 104 may have the configuration shown in any of FIGS. 1–3 and are inversely oriented with respect to each other. As shown, the surfaces 106, 108, 110 and 112 are the same as the surface 18 in FIG. 1. The member 100 then is provided with surfaces 114 and 116 which are similar to or the same as the surfaces 20, 22 in FIG. 10 which are as shown inversely oriented. The member 100, however, then has the further surfaces 118 and 120 which are the same as surfaces 114 and 116 and are again oriented inversely with respect to these particular surfaces as shown in FIG. 16. Again, all the surfaces on the member 100 may be as the surface 18 or surfaces 54 or 70 as illustrated in FIGS. 1, 2 and 3 depending on the resiliency of which the material of the members 98 and 100 are constructed. One complete surface 121 of the member 100 is illustrated by itself in detail in FIG. 4.

The structure shown in FIG. 17 includes three separate members 122, 124 and 126 which it is desired to connect together in a single plane by the connecting structure of the invention. The members 122, 124 and 126 are shown in transverse section connected together in a single plane in FIG. 18.

The member 122 in accordance with the invention is provided with flat end surfaces 128 and 130 generally perpendicular to the plane of the member and is provided with side surfaces 132 and 134 which are substantially the same as the side surfaces 20 and 22 of the member 14 as shown in FIG. 10. The side surfaces 132 and 134 could of course be the same as the side surfaces 48 and 50 of the member 38 and can be the same as the surfaces 18 and 42 shown in FIGS. 1 and 2 in inverse relation on the opposite sides of the member 122 as desired and as required in accordance with the resiliency of the material utilized.

The member 124 of FIG. 17 then as shown is generally polygonal and more particularly rectangular in form and has the rectangular opening 136 extending therethrough including the flat end surfaces 138 and 140 in the opening 136 and the flat end surfaces 142 and 144 as shown in FIG. 17. The side surfaces 146 and 148 of the opening 136 are then constructed complementary to the surfaces 132 and 134 of the member 122 and are thus similar to the surfaces 16 and 18 of the connecting structure 10 or similar to the side surfaces 40 and 42 of the connecting structure 34. The surfaces 146 and 148 may also be similar to the surfaces 68 and 70 of the member 64, if desired. The outer side surfaces 150 and 152 of the member 124 as shown in FIG. 17 are then similar to the surfaces 20 and 22 of the modification 10 of the connecting structure or are similar to the surfaces 48 and 50 of the modification 34 of the connecting structure of FIG. 12.

The member 126 is substantially the same as the member 124 and again has the straight, flat end surfaces 154 and 156 in the opening 158 and the inversely oriented side surfaces 160 and 162 having a configuration complementary to the surfaces 150 and 152 of the member 124. The outer end surfaces 164 and 166 and the side surfaces 168 and 170 may of course have any configuration since the connecting of the three members 122, 124 and 126 together does not depend upon the outer end or side surfaces of the member 126. As shown, these surfaces are similar to the outer end and side surfaces of the member 122.

Figure 5:
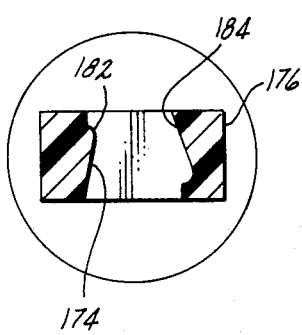
FIG. 5 is a partial section view of connecting structure constructed in accordance with the invention on one member for use in another particular application of the invention.
Figure 6:
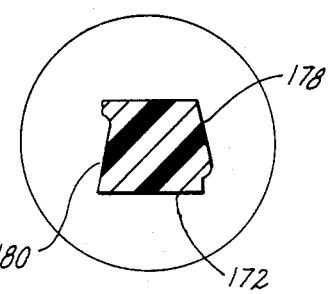
FIG. 6 is a partial section view of connecting structure constructed in accordance with the invention on one member for use in still another particular application of the invention.

A similar modification of the connecting structure of the invention to that utilized in connecting the members 122, 124 and 126 is shown in FIGS. 5 and 6. Thus, the member 172 shown in cross section in FIG. 6 will fit within the opening 174 of the member 176 shown in cross section in FIG. 5. The basic structure of members 172 and 174 utilizes inversely oriented side portions 178 and 180 and 182 and 184 which again may be in accordance with the surfaces illustrated in FIGS. 1–3.

Figure 7:
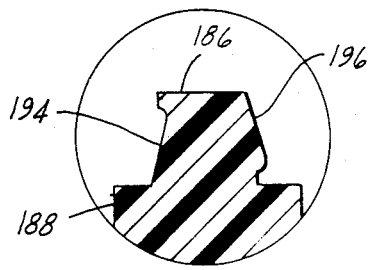
FIG. 7 is a partial section view of connecting structure constructed in accordance with the invention utilized in stud fastener applications.
Figure 9:
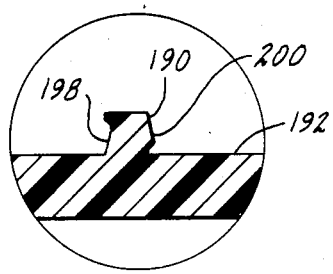
FIG. 9 is a partial section view of connecting structure generally similar to that shown in FIG. 7 illustrating the invention as shown in FIG. 7 applied to a flat plate.

The basic structure of FIGS. 5 and 6 may thus be utilized to connect members such as that shown in FIGS. 17 and 18 or alternatively, for example, the member 180 may be a projection 186 on a stud 188 as shown in FIG. 7, or may be a projection 190 on a plane 192 as shown in FIG. 9. Again, the side surfaces 194 and 196 and the side surfaces 198 and 200 may be the same as the side surfaces shown in FIG. 1 or FIG. 2, as desired. The end surfaces of the projections 186 and 190 as shown may be flat surfaces as are the end surfaces in the opening 174 of member 176 and on the member 172 and as shown on the members 122, 124 and 126 in FIG. 17.

The projection 186 may in fact include a slot 202 therein extending parallel to the side surfaces 194 and 196 on the stud 188 to facilitate inserting the projection 202 into an opening as for example the opening in the member 176 illustrated in FIG. 5.

Figure 15:
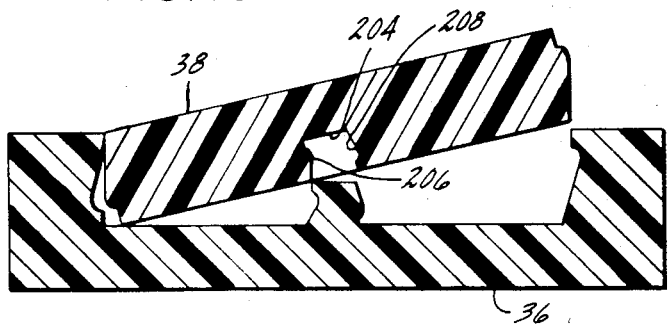
FIG. 15 is similar to FIG. 12 and in addition shows the members connected together with additional connecting structure constructed in accordance with the invention as particularly shown in FIG. 9.

As shown in FIG. 15, the projection 200 on the plane 192 may be utilized in conjunction with connecting structure such as shown in FIGS. 10, 12 and 14. Specifically, the connector structure of FIG. 12 is illustrated in FIG. 15. The member 38 of FIG. 12 is then provided with the recess 204 therein having parallel inversely oriented spaced apart sides 206 and 208 therein. The recess 204 is as shown in FIG. 15 entirely complementary to the projection 200 and aids in securing the member 38 to the member 36.

The connecting structure of the invention is shown in a particular structure, that is, a novelty or stop box 210 in FIGS. 20–27.

The box 210 includes a container 212 and a cover 214 for the container 212. The cover 214 is secured to the container 212 by the connecting structure of the invention. As shown, the connecting structure 10 is utilized in the box 210, although connecting structures 34 or 62 may be utilized in conjunction therewith along with the modifications thereof coming within the scope of the invention.

More specifically, the container 212 includes a front 216, a back 218, sides 220 and 222 and bottom 224. As shown, the front, back and sides are tapered slightly such as by 2° or so toward the bottom 224.

The ends 226 and 228 of the opening in the top 230 of the container 212 are substantially as shown in FIG. 23. They include substantially straight, flat portions 232 and 234 inset in the sides 220 and 222 to form ledges 236 and 238 at the opposite ends of the opening 230 on which the top 214 rests.

The top 214 is provided with flat end surfaces 240 and 242 adapted to fit snugly against the surfaces 232 and 234 with the top in assembly in the opening in the top of the container 212.

The sides 244 and 246 of the opening 230 are formed with parallel spaced apart, inversely oriented surfaces at the upper ends thereof which are substantially the same as the surfaces of the connecting structure 10 shown in FIG. 10, while the sides 248 and 250 of the top 214 are provided with surfaces such as surfaces 220 and 222 of the member 214 of the connecting structure 10 so that once the top 214 is positioned on the container 212, it is extremely difficult to remove.

It will be understood that the top may be placed on the container in an inverted manner as shown in FIGS. 12 and 14. Further, the connecting structure utilized in the box 210 may be in accordance with any modification within the scope of the invention.

The utility of the box 210 is as a novelty box. For example, the box 210 and lid 214 may be made of a smoky plastic material which permits viewing of material placed inside the container 212. The box 210 could then be utilized to hold a package of cigarettes of a smoker who desires to quit smoking, with the idea being that the box 210 will be the only cigarette case the smoker will ever need because he cannot get into it to get the cigarettes, or it will at least be difficult to open the case to get a cigarette.

Other uses of other boxes of configurations having tops connected in accordance with the invention are envisioned. For example, containers may be utilized for encapsulating capacitors or other electrical equipment, particularly those involving high voltage. Similar boxes could be used for rubber stamp pads or containers wherein the tops have projections or handles thereon for permitting opening thereof. The utilization of the invention to secure lids and containers together are unlimited. Thus, the invention contemplates the use of the containers for toxic waste, for butterfly cases, etc. Further, the invention is not limited to utilization in conjunction with boxes.

Figure 28:
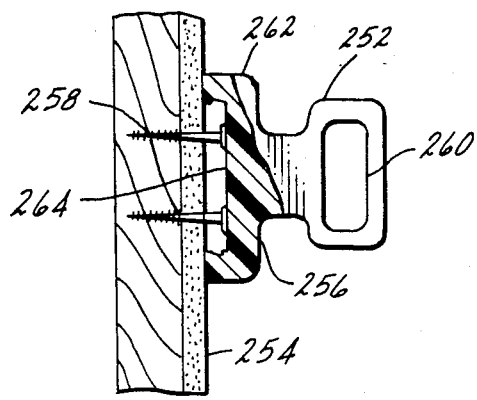
FIG. 28 is a section view of a towel rack including members connected together by the connecting structure of the invention.

As shown in FIG. 28, the connecting structure of the invention may be utilized to secure a towel rack 252 to a wall 254. In such use, a bracket 256 is secured to the wall by convenient means such as screws 258 or the like, while the actual towel hanging bar 260 is supported in carriers 262 at each end thereof, which carriers include a recess 264 therein for receiving the brackets 256. Each bracket 256 is then formed as for example any of the members 16, 38 and 62 in the connecting structures 10, 34 and 62 as shown in FIGS. 10, 12 and 14, while the carriers 262 are constructed so that the recesses 264 are in the shape of the recesses 26, 54 and 72 in the connecting structure shown in FIGS. 10, 12 and 14.

Figure 29:
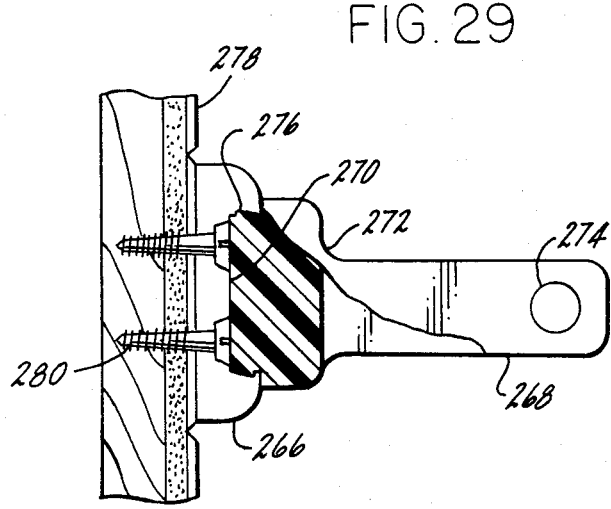
FIG. 29 is an elevation view partly in section of a paper rack including members connected together by the connecting structure of the invention.

As shown in FIG. 29, the bracket 266 of a paper dispenser 268 may include the recess 270 therein while the carrier 272 for the paper holding roller 274 may include the projection 276 thereon. In the structure as shown in FIG. 29, the bracket 266 is again secured to the wall 278 by the screws 280. Further, in the construction of FIG. 29 the bracket 266 includes the recess 270 therein which is similar to one of the recesses 26, 44 and 72 in the connecting structures shown in FIGS. 10, 12 and 14, while the carrier 272 includes the projection 276 which is similar to the members 14, 38 and 66 in FIG. 5.

Figure 30:
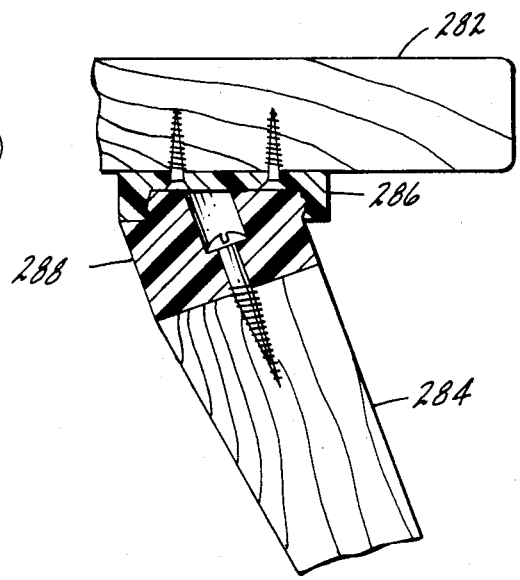
FIG. 30 is an elevation view partly in section of furniture structure including members connected together by the connecting structure of the invention.

A further utilization of the connecting structure of the invention is illustrated in FIG. 30 wherein a table top 282 and a table leg 284 are connected together by a bracket 286 and a connecting member 288. Again, the bracket 286 and connecting member 288 have connecting structure therein as shown best in FIG. 10, but may have the connecting structure incorporated therein as shown in FIGS. 12 and 14.

Figure 8:
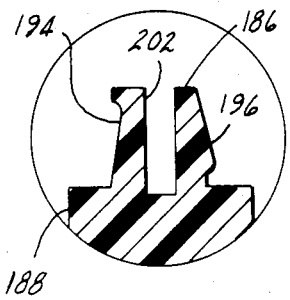
FIG. 8 is a partial section view of modified connecting structure constructed in accordance with the invention also utilized in stud fastener applications.
Figure 31:
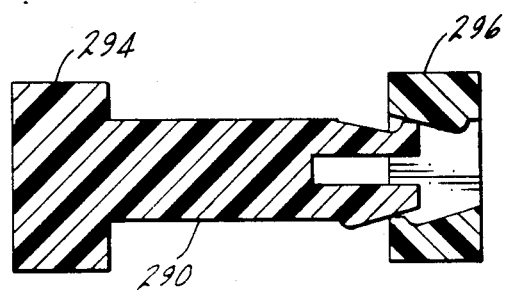
FIG. 31 is a longitudinal section view of fastener structure utilizing connecting structure in accordance with the invention.
Figure 32:
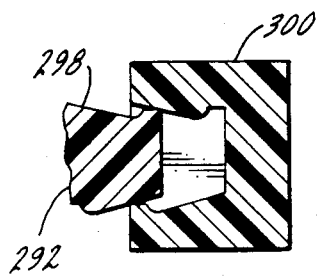
FIG. 32 is a partial section view similar to FIG. 31 showing a modification of the connecting structure.

As shown in FIGS. 31 and 32, the structure of the invention particularly as shown in FIGS. 7 and 8 is utilized to provide fasteners 290 and 292. Such fasteners are in the nature of bolt and nut fasteners, with the member 294 acting as a bolt and the member 296 acting as a nut. Similarly, the partially shown member 298 acts as a bolt while the member 300 would act as a nut on the end of the fastener 292.

While one embodiment and modifications of the invention have been considered in detail herein, it will be understood that other embodiments and modifications are contemplated. It is the intention to include all such embodiments and modifications as are defined by the appended claims within the scope of the invention.

I claim:

1. Connecting structure comprising a first member having spaced apart opposed, oppositely directed substantially identical surfaces each of which have a cross section configuration including a short portion at one edge of the surface, a longer portion extending obliquely inwardly of the member and a connecting portion connecting the short portion and oblique portion of the surface cross section configuration and a second member having complementary spaced apart surfaces thereon adapted to engage the surfaces of the first member to secure the first and second members together.

2. Structure as set forth in claim 1, wherein the oblique portion of the surface cross section configuration starts exactly in the plane of the short portion of the surface cross section configuration.

3. Structure as set forth in claim 1, wherein the oblique portion of the surface cross section configuration starts outwardly of the plane of the short portion so as to cross the plane of the short portion of the surface prior to intersecting the connecting portion of the surface cross section configuration.

4. Structure as set forth in claim 1, wherein the opposed surfaces of the first member include short portions at both edges thereof, an obliquely extending portion extending from the middle thereof outwardly of the first members, which obliquely extending portions merge into connecting portions which engage the short portions.

5. Structure as set forth in claim 1, wherein the second member is positioned with respect to the first member whereby the connecting portions of the surface cross section configurations which are on opposite sides thereof are adjacent opposite edges thereof.

6. Structure as set forth in claim 1, wherein the short portion and oblique portion of the surface cross section configuration are straight lines and the connecting portion is arcuate.

7. Structure as set forth in claim 1, wherein the first member is generally rectangular and two of the opposing sides of the rectangle have the opposed surfaces thereon.

8. Structure as set forth in claim 7, wherein the first member is a relatively long, narrow member and the opposed surfaces are at one end thereof.

9. Structure as set forth in claim 8, and further including a slot extending axially across the one end of the first member.

10. Structure as set forth in claim 7, wherein the first member is secured on a flat member having substantial dimensions in two directions defining a plane from which the first member extends.

11. Structure as set forth in claim 1, wherein the first member is generally rectangular and has a rectangular opening therethrough and said parallel surfaces are two opposed surfaces of the opening therethrough.

12. Structure as set forth in claim 11, wherein the first member is generally rectangular and the parallel surfaces are two opposed side surfaces of the rectangular mamber.

13. Structure as set forth in claim 1, wherein the first member further includes second, parallel, spaced apart, obliquely directed surfaces each having a short portion at one edge thereof, a longer portion extending obliquely to the short portion and a connecting portion intersecting the obliquely extending portion and the short portion whereby a third member may be connected to said second parallel surfaces to connect said second and third members through the first member.

* * * * *